United States Patent [19]

Yamana et al.

[11] Patent Number: 5,510,407
[45] Date of Patent: Apr. 23, 1996

[54] MOLD RELEASE AGENT COMPOSITION

[75] Inventors: Masayuki Yamana; Seiji Takubo, both of Settsu, Japan

[73] Assignee: Daikin Industries Ltd., Osaka, Japan

[21] Appl. No.: 142,380

[22] PCT Filed: Mar. 26, 1993

[86] PCT No.: PCT/JP93/00366

§ 371 Date: Feb. 25, 1994

§ 102(e) Date: Feb. 25, 1994

[87] PCT Pub. No.: WO93/19918

PCT Pub. Date: Oct. 14, 1993

[30] Foreign Application Priority Data

Mar. 30, 1992 [JP] Japan .................................. 4-073791

[51] Int. Cl.$^6$ ........................................ C08K 5/24
[52] U.S. Cl. ...................... 524/269; 524/544; 524/545; 524/546
[58] Field of Search .................... 524/269, 544, 524/545, 546

[56] References Cited

U.S. PATENT DOCUMENTS 4,673,621  6/1987  Fujiki et al. .......................... 524/544
5,079,299  1/1992  Hisamoto et al. .

FOREIGN PATENT DOCUMENTS

| | | |
|---|---|---|
| 58-021491 | 2/1983 | Japan . |
| 58-172244 | 11/1983 | Japan . |
| 0244884 | 11/1987 | Japan . |
| 0248383 | 12/1987 | Japan . |
| 63-075082 | 4/1988 | Japan . |
| 63-077962 | 8/1988 | Japan . |
| 02-281063 | 11/1990 | Japan . |
| 04-062113 | 2/1992 | Japan . |

*Primary Examiner*—Jeffrey T. Smith
*Attorney, Agent, or Firm*—Birch, Stewart, Kolasch & Birch

[57] ABSTRACT

A mold release agent composition which contains A) 10 to 95% by weight of a copolymer of a polyfluoroalkyl acrylate or methacrylate ester having a polyfluoroalkyl group having 1 to 20 carbon atoms and a vinyl compound having an alkyl group having 8 to 30 carbon atoms, and B) 90 to 5% by weight of a silicone, has sufficient releasability, has an only slightly amount of the migration to a shaped article and gives no adverse effect on fabricability of a shaped article surface.

14 Claims, No Drawings

MOLD RELEASE AGENT COMPOSITION

BACKGROUND OF THE INVENTION

1. Field of the Invention

The present invention relates to a mold release agent composition. Particularly, it relates to a mold release agent composition for the molding, which is suitable for molding a shaped article made of a synthetic resin, a synthetic rubber or the like.

2. Description of Related Art

When a shaped article made of a synthetic resin such as an acrylic resin, an epoxy resin, a urethane resin, a vinyl chloride resin, a vinyl acetate resin and a shaped article made of a synthetic rubber are shaped, a mold release agent is coated on an internal surface of a mold so as to facilitate the release of the shaped article from the mold.

As the mold release agent used in such case, for example, wax mold release agents such as a paraffin wax, a wax of a higher fatty acid ester and a polyethylene wax are known. These wax mold release agents have been widely used, since they are available with the low cost and give the resultant shaped article having a good surface state.

However, the wax mold release agent has low releasing strength so that sufficient release effect cannot be achieved, unless the wax mold release agent is thickly coated on the mold when the shaped article is shaped by using a material having high adhesion strength such as an epoxy resin and a urethane resin. Accordingly, the internal surface of the mold is contaminated with repeated molding. This problem also gives an adverse effect on the dimensional accuracy of the shaped article.

The wax mold release agent disadvantageously has low adhesion strength to the mold so that the mold release agent easily migrates to the shaped article and has poor continuity of release effect. This problem results in that the mold release agent must be coated each time the shaping step is to be performed.

In addition, when the shaped article is released from the mold, a large amount of the wax mold release agent migrates to the shaped article so that the wax mold release agent gives poor fabricability (for example, printing and coating) of the shaped article surface.

As the mold release agent for solving the above problems, a fluorine-containing mold release agent [a copolymer of a polyfluoroalkyl ester of (meth)acrylic acid and a substituted vinyl compound] is known (cf. Japanese Patent Kokai Publication Nos. 101319/1984 and 255404/1985).

Since the fluorine-containing mold release agent has excellent release strength, it give a sufficient release effect by thinly coating it. The fluorine-containing mold release agent has better adhesion strength to the mold than the above wax mold release agent so that it gives excellent continuity to the release effect.

However, even the fluorine-containing mold release agent cannot completely prevent the migration to the shaped article surface. The migration of the fluorine-containing mold release agent to the shaped article surface gives an adverse effect on the fabricability (printing or coating) of the shaped article surface. The reason for this is that the fluorine-containing mold release agent which migrated to the shaped article surface exhibits also the release effect against the ink and paint used for the printing and coating.

Japanese Patent Kokoku Publication No. 8425/1991 discloses a mold release agent which comprises a copolymer obtainable by polymerizing a perfluoroalkyl group-containing vinyl monomer, a phosphoric acid-containing vinyl monomer and a hydrocarbon vinyl monomer. However, since this mold release agent contains a large amount of phosphoric acid, a curing reaction was inhibited in the case of the resin and the rubber such as a urethane resin reacting during the molding step so that the appearance of the shaped article surface is not good. In addition, the reaction of the mold release agent with the shaped article results in the contamination of the mold.

From Japanese Patent Kokoku Publication No. 32514/1984, a mold release agent which comprises a mixture of a polyfluoroalkyl group-containing copolymer and a silicone resin is also known. However, since the silicone is mixed in a large amount, the shaped article surface is sticky and has poor fabricability. The silicone results in the pollution of the working atmosphere. The silicone-containing mold release agent has a problem that it gives a sticky shaped article surface and poor fabricability of the shaped article surface when it migrates to the shaped article surface.

SUMMARY OF THE INVENTION

An object of the present invention is to solve the above problems and to provide a mold release agent having good fabricability of the shaped article surface and good releasability.

An aspect of the present invention resides in a mold release agent composition comprising A) 10 to 95% by weight of a copolymer of a polyfluoroalkyl acrylate or methacrylate ester having a polyfluoroalkyl group having 1 to 20 carbon atoms and a vinyl compound having an alkyl group having 8 to 30 carbon atoms, and B) 90 to 5% by weight of a silicone.

DETAILED DESCRIPTION OF THE INVENTION

When the mold release agent composition of the present invention is coated on the internal surface of the mold, components A and B are not compatible with each other. A layer mainly containing the component A is separated from a layer mainly containing the component B, and the component A mainly plays the adhesion action to the mold and the component B mainly plays the release action from the mold. The vinyl compound having the alkyl group having 8 to 30 carbon atoms copolymerized in the component A entraps the component B due to the long chain alkyl group thereof. Namely, the layer mainly containing the component A is formed on the mold and the layer mainly containing the component B is formed on the shaped article. During the release of the shaped article, the shaped article can be easily released from the mold, since the layer mainly containing the component A does not migrate to the shaped article surface and the layer mainly containing the component B is destroyed. The amount of the layer mainly containing the component B which migrates to the shaped article after the destruction is smaller than the migration amount in the case that the mold release agent of silicone alone is used. Accordingly, the shaped article surface is not sticky and the fabricability of the shaped article surface is not adversely affected.

A specific example of polyfluoroalkyl acrylate or methacrylate ester preferably used in the present invention is a compound of the formula:

$$CH_2=CR^1COOR^2Rf$$

wherein

R$^1$ is a hydrogen atom or a methyl group,

R$^2$ is a linear or branched alkylene group having 1 to 10 carbon atoms,

—SO$_2$N(R$^3$)R$^4$— group or —CH$_2$CH(OR$^5$)CH$_2$— group (wherein R$^3$ is an alkyl group having 1 to 10 carbon atoms, R$^4$ is a linear or branched alkylene group having 1 to 10 carbon atoms, and R$^5$ is a hydrogen atom or an acyl group having 1 to 10 carbon atoms), and Rf is a linear or branched polyfluoroalkyl group having 1 to 20 carbon atoms.

Specific examples of such compound are as follows:

CF$_3$(CF$_2$)$_7$(CH$_2$)$_{10}$OCOCH=CH$_2$
CF$_3$(CF$_2$)$_7$(CH$_2$)$_{10}$OCOC(CH$_3$)=CH$_2$
CF$_3$(CF$_2$)$_6$CH$_2$OCOCH=CH$_2$
CF$_3$(CF$_2$)$_6$CH$_2$OCOC(CH$_3$)=CH$_2$
(CF$_3$)$_2$CF(CF$_2$)$_6$(CH$_2$)$_2$OCOCH=CH$_2$
CF$_3$(CF$_2$)$_8$CH$_2$OCOCH=CH$_2$
CF$_3$(CF$_2$)$_8$CH$_2$OCOC(CH$_3$)=CH$_2$
(CF$_3$)$_2$CF(CF$_2$)$_8$(CH$_2$)$_2$OCOCH=CH$_2$
(CF$_3$)$_2$CF(CF$_2$)$_{10}$(CH$_2$)$_2$OCOCH=CH$_2$
(CF$_3$)$_2$CF(CF$_2$)$_6$(CH$_2$)$_2$OCOC(CH$_3$)=CH$_2$
(CF$_3$)$_2$CF(CF$_2$)$_8$(CH$_2$)$_2$OCOC(CH$_3$)=CH$_2$
(CF$_3$)$_2$CF(CF$_2$)$_{10}$(CH$_2$)$_2$OCO(CH$_3$)=CH$_2$
CF$_3$CF$_2$(CF$_2$)$_6$(CH$_2$)$_2$OCOCH=CH$_2$
CF$_3$CF$_2$(CF$_2$)$_8$(CH$_2$)$_2$OCOCH=CH$_2$
CF$_3$CF$_2$(CF$_2$)$_{10}$(CH$_2$)$_2$OCOCH=CH$_2$
CF$_3$CF$_2$(CF$_2$)$_6$(CH$_2$)$_2$OCOC(CH$_3$)=CH$_2$
CF$_3$CF$_2$(CF$_2$)$_8$(CH$_2$)$_2$OCOC(CH$_3$)=CH$_2$
CF$_3$CF$_2$(CF$_2$)$_{10}$(CH$_2$)$_2$OCOC(CH$_3$)=CH$_2$
H(CF$_2$)$_8$CH$_2$OCOC(CH$_3$)=CH$_2$
H(CF$_2$)$_8$CH$_2$OCOCH=CH$_2$
Cl(CF$_2$CF$_2$)$_3$CH$_2$OCOCH=CH$_2$
Cl(CF$_2$CF$_2$)$_3$CH$_2$OCOC(CH$_3$)=CH$_2$
Cl(CF$_2$CF$_2$)$_4$CH$_2$OCOCH=CH$_2$
Cl(CF$_2$CF$_2$)$_4$CH$_2$OCOC(CH$_3$)=CH$_2$
CF$_3$(CF$_2$)$_7$SO$_2$N(CH$_3$)(CH$_2$)$_2$OCOCH=CH$_2$
CF$_3$(CF$_2$)$_7$SO$_2$N(C$_2$H$_5$)(CH$_2$)$_2$OCOC(CH$_3$)=CH$_2$
(CF$_3$)$_2$CF(CF$_2$)$_8$CH$_2$CH(OCOCH$_3$)CH$_2$OCOC(CH$_3$)=CH$_2$
(CF$_3$)$_2$CF(CF$_2$)$_8$CH$_2$CH(OH)CH$_2$OCOCH=CH$_2$
CF$_3$CF$_2$(CF$_2$CF$_2$)$_n$CH$_2$CH$_2$OCOCH=CH$_2$
(a mixture of compounds in which the values of n are 3 to 5)

Specific examples of the preferable vinyl compound having the alkyl group having 8 to 30 carbon atoms are compounds of the formulas:

CH$_2$=CR$^1$COOR$^6$
CH$_2$=CHOR$^6$
CH$_2$=CHOCOR$^6$
CH$_2$=CHR$^6$ wherein

R$^1$ is the same as defined above, and

R$^6$ is an C$_{8-30}$ alkyl group, aralkyl group, alkenyl group, or alkyl group, aralkyl group or alkenyl group substituted with a hydroxyl group or carboxyl group.

Specific examples of such compounds are as follows:

CH$_2$=CHCOOC$_8$H$_{17}$
CH$_2$=CHCOOC$_{10}$H$_{21}$
CH$_2$=CHCOOC$_{12}$H$_{25}$
CH$_2$=CHCOOC$_{18}$H$_{37}$
CH$_2$=CHCOOC$_{22}$H$_{45}$
CH$_2$=C(CH$_3$)COOC$_8$H$_{17}$
CH$_2$=C(CH$_3$)COOC$_{10}$H$_{21}$
CH$_2$=C(CH$_3$)COOC$_{12}$H$_{25}$
CH$_2$=C(CH$_3$)COOC$_{18}$H$_{37}$
CH$_2$=C(CH$_3$)COOC$_{22}$H$_{45}$

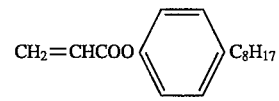

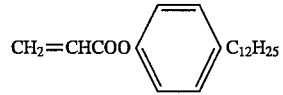

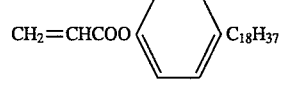

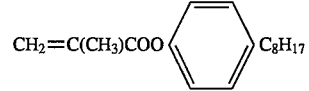

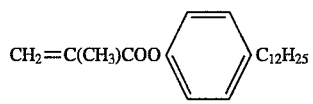

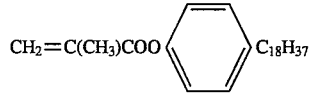

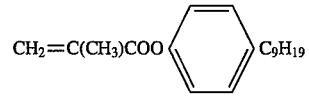

CH$_2$=CHOC$_8$H$_{17}$
CH$_2$=CHOC$_{10}$H$_{21}$
CH$_2$=CHOC$_{12}$H$_{25}$
CH$_2$=CHOC$_{16}$H$_{33}$
CH$_2$=CHOC$_{18}$H$_{37}$
CH$_2$=CHOCOC$_8$H$_{17}$
CH$_2$=CHOCOC$_9$H$_{19}$
CH$_2$=CHOCOC$_{11}$H$_{23}$
CH$_2$=CHOCOC$_{15}$H$_{30}$
CH$_2$=CHOCOC$_{17}$H$_{35}$
CH$_2$=CHC$_9$H$_{19}$

The amount of the polyfluoroalkyl acrylate or methacrylate ester is preferably from 20 to 85% by weight, more preferably from 30 to 70% by weight of the copolymer. If it is smaller than 20% by weight, a sufficient effect cannot be obtained and the mold is often contaminated. If it is larger than 85% by weight, the releasability is not good.

The carbon number of the polyfluoroalkyl group is from 1 to 20, preferably from 5 to 20, more preferably from 8 to 20. The carbon number larger than 20 is economically unsuitable.

The carbon number of the alkyl group in the vinyl compound having the alkyl group is from 8 to 30, preferably 14 to 30. If it is smaller than 8, the releasability is not sufficient, the strength of the copolymer for entrapping the silicone is low and a large amount of the silicone migrates to the shaped article so that the fabricability is deteriorated. If it is larger than 30, the vinyl compound is difficultly available and is commercially unsuitable.

The copolymer may comprise another vinyl compound, for example, butyl methacrylate, ethyl methacrylate, glycidyl methacrylate, 2-hydroxyethyl methacrylate, styrene and cyclohexyl methacrylate, in addition to the polyfluoroalkyl acrylate or methacrylate ester and the vinyl compound having the alkyl group having 8 to 30 carbon atoms in order to improve the film formability of the coating and the durability. The amount of the other vinyl compound is preferably not larger than 10% by weight of the copolymer. If it is larger than 10% by weight, releasability is deteriorated.

The copolymer according to the present invention can be prepared by any of the various polymerization reaction types and conditions. The various polymerization reaction types include the types such as bulk polymerization, solution polymerization, suspension polymerization, emulsion polymerization and radiation polymerization.

Specific examples of the silicone used according to the present invention are a dimethylpolysiloxane oil, an alkylmethylpolysiloxane oil, a silicone resin comprising $SiO_2$ and $(CH_3)_3SiO_{1/2}$.

In the mold release agent composition according to the present invention, a ratio of the copolymer to the silicone is such that the copolymer is from 10 to 95% by weight and the silicone is from 90 to 5% by weight, preferably the copolymer is from 10 to 90% by weight and the silicone is from 90 to 10% by weight, more preferably the copolymer is from 20 to 70% by weight and the silicone is from 80 to 30% by weight. In the above Japanese Patent Kokoku Publication No. 32514/1984, the amount of the polymer containing the polyfluoroalkyl group in the mold release agent composition is limited to 0.1 to 10% by weight of the whole composition, since a large amount of the polymer gives an adverse effect on the releasability. However, in the present invention, since the polyfluoroalkyl group-containing copolymer comprises the vinyl compound having the alkyl group having 8 to 30 carbon atoms and gives no adverse effect on the releasability, an amount larger than 10% by weight results in a smaller amount of the silicone and gives a good effect on the fabricability and stickiness of the shaped article surface.

When the mold release agent composition according to the present invention is coated on the mold, any of various coating procedures such as brushing, dip coating and spray coating can be used. The mold release agent composition according to the present invention is preferably dissolved or dispersed in water or an organic solvent, when it is coated on the mold. After the coating, a drying alone is necessary. The composition may be an aerosol comprising a propellant such as 1,1,1,2-tetrafluoroethane and a liquefied petroleum gas.

The mold release agent composition according to the present invention has good solubility in various solvents. In particular, when the copolymer comprising at least 15% by weight of the vinyl compound having the alkyl group having 8 to 30 carbon atoms is used, the composition which conventionally dissolved in only a fluorine- or chlorine-containing organic solvent or a hydrocarbon organic solvent can also dissolve in an organic solvent such as an ester organic solvent and a petroleum organic solvent so that the used solvent can be selected from an extended range of solvents. The concentration of the mold release agent composition in water or the organic solvent is generally from 0.001 to 20% by weight, preferably from 0.01 to 3% by weight.

PREFERRED EMBODIMENT OF THE INVENTION

The present invention will be illustrated by the following Examples.

EXAMPLE 1

Copolymer:
(1) $CF_3CF_2(CF_2CF_2)_nCH_2CH_2OCOCH=CH_2$ 70 wt %
(a mixture of the compounds in which the values of n are 3, 4 and 5 in a weight ratio of 5:3:1)
(2) $C_{18}H_{37}OCOCH=CH_2$ 30 wt %

A mold release agent composition consisting of the copolymer having the above composition (3 parts by weight), silicone a (0.5 parts by weight), silicone b (0.5 parts by weight) and isooctane (96 parts by weight) was subjected to a mold release test. The results shown in Table 3 were obtained. Further, in order to evaluate the fabricability of a shaped article surface, a coating test of the shaped article was conducted. The results are shown in Table 3.

EXAMPLES 2 TO 15

Mold release agent compositions shown in Table 1 were subjected to the mold release test and the coating test. The results are shown in Table 3.

COMPARATIVE EXAMPLES 1 TO 14

Mold release agent compositions shown in Table 2 were subjected to the mold release test and ! the coating test. The results are shown in Table 3.

Mold release test (1) A mold release agent was brush-coated on an aluminum mold having a dimension of 6 cm (diameter)×1 cm.

(2) A urethane having the following composition was sufficiently stirred in a mixer and poured into the mold described in (1).

(3) After the urethane was cured at a room temperature for 10 minutes, the releasability was evaluated by pulling a stick which was previously stood in a shaped article.

1: The shaped article can be released from the mold almost without a force.

2: The shaped article can be released from the mold with a slight force.

3: The shaped article can be released from the mold with a strong force.

4: The shaped article cannot be released from the mold.

Coating test (Check pattern test)

A coating test was conducted according to JIS D-0202.

(1) The following primer paint was brush-coated on the shaped article released in the mold release test.

(2) After the shaped article was dried at 80° C. for 10 minutes, a check pattern test was conducted.

(3) Further, the following top coat paint was brush-coated on the shaped article.

(4) After the shaped article was dried at 100° C. for 40 minutes, the check pattern test was conducted.

| Composition of urethane | |
|---|---|
| Polyether polyol having a hydroxyl value of 28.1 | 100 pbw |
| Ethylene glycol | 19 pbw |
| Trichlorofluoromethane | 5 pbw |
| Amine catalyst | 0.9 pbw |
| Dibutyltin dilaurate | 0.025 pbw |
| Diphenylmethanediisocyanate | 104 pbw |
| Paint (manufactured by Dainippon Paint Co. Ltd.) | |
| Primer paint | |
| Puranito L # 75 | 100 pbw |
| Puranito L # 75 Thinner | 100 pbw |
| Top coat paint | |
| Puranito S | 100 pbw |
| Puranito Thinner # 10 | 100 pbw |

TABLE 1

| Example | Copolymer Composition of copolymer | | Silicone | pbw | | Emulsifier | pbw | Solvent | pbw |
|---|---|---|---|---|---|---|---|---|---|
| | | pbw | | | | | | | |
| 1 | $CF_3CF_2(CF_2CF_2)_nCH_2CH_2OCOCH=CH_2$ (a mixture of compounds wherein the values of n are 3, 4 and 5 in a weight ratio of 5:3:1) | 70 wt % | Silicone a | 3 | 0.5 | — | | Isooctane | 96 |
| | $C_{18}H_{37}OCOCH=CH_2$ | 30 wt % | Silicone b | | 0.5 | | | | |
| 2 | $CF_3CF_2(CF_2CF_2)_3CH_2CH_2OCOCH=CH_2$ | 30 wt % | Silicone a | 2 | 2 | — | | Decane | 96 |
| | $C_{18}H_{37}OCOCH=CH_2$ | 70 wt % | | | | | | | |
| 3 | $CF_3CF_2(CF_2CF_2)_3SO_2N(CH_3)CH_2CH_2OCOC(CH_3)=CH_2$ | 50 wt % | Silicone c | 3.5 | 0.5 | — | | Butyl acetate | 96 |
| | $C_{12}H_{25}OCOCH=CH_2$ | 50 wt % | | | | | | | |
| 4 | $CF_3CF_2(CF_2CF_2)_nCH_2CH(OCOCH_3)CH_2OCOCH=CH_2$ | 80 wt % | Silicone d | 0.5 | 3.5 | — | | Trichloro-trifluoroethane | 96 |
| | $C_{22}H_{45}OCOCH=CH_2$ | 20 wt % | | | | | | | |
| 5 | $CF_3CF_2(CF_2CF_2)_3CH_2CH_2OCOC(CH_3)=CH_2$ | 85 wt % | Silicone b | 3 | 1 | — | | Trichloro-trifluoroethane | 96 |
| | $C_{10}H_{21}OCOCH=CH_2$ | 15 wt % | | | | | | | |
| 6 | $CF_3CF_2(CF_2CF_2)_3CH_2CH_2OCOC(CH_3)=CH_2$ | 80 wt % | Silicone d | 1 | 3 | — | | Trichloro-trifluoroethane | 96 |
| | $C_{18}H_{37}OCOC(CH_3)=CH_2$ | 20 wt % | | | | | | | |
| 7 | $H(CF_2CF_2)_4CH_2OCOCH=CH_2$ | 50 wt % | Silicone b | 3 | 1 | — | | Petroleum ether | 96 |
| | $C_{22}H_{45}OCOC(CH_3)=CH_2$ | 50 wt % | | | | | | | |
| 8 | $(CF_3)_2CF(CF_2CF_2)_3CH_2CH(OH)CH_2OCOCH=CH_2$ | 30 wt % | Silicone b | 3 | 1 | — | | Trichloro-trifluoroethane | 96 |
| | $C_8H_{17}OCOC(CH_3)=CH_2$ | 70 wt % | | | | | | | |
| 9 | $CF_3CF_2(CF_2CF_2)_3(CH_2)_{10}OCOCH=CH_2$ | 30 wt % | Silicone a | 3 | 2 | — | | Xylene | 96 |
| | $C_{18}H_{37}OCOCH=CH_2$ | 70 wt % | | | | | | | |
| 10 | the same as in Example 1 | | Silicone b | 0.5 | 0.1 | — | | Isooctane | 99.4 |
| 11 | the same as in Example 1 | | Silicone b | 3 | 1 | — | | Trichloro-trifluoroethane | 86 |
| | $CF_3CF_2(CF_2CF_2)_3CH_2CH_2OCOCH=CH_2$ | 50 wt % | | | | | | | |
| | $(HO)_2P(O)OCH_2CH_2OCOCH=CH_2$ | 5 wt % | | | | | | | |
| | $C_{10}H_{21}OCOCH=CH_2$ | 45 wt % | | | | | | Isopropyl alcohol | 10 |
| 12 | the same as in Example 1 | | Silicone a | 3 | 0.5 | 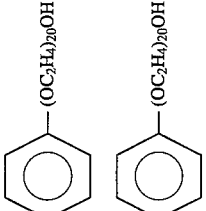 $C_8H_{17}$—⟨⟩—$(OC_2H_4)_{20}OH$ | 0.2 | Water | 95.8 |
| | | | Silicone b | | 0.5 | | | | |
| 13 | the same as in Example 2 | | Silicone a | 2 | 2 | 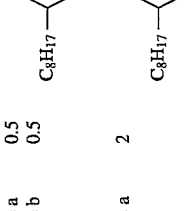 $C_8H_{17}$—⟨⟩—$(OC_2H_4)_{20}OH$ | 0.2 | Water | 95.8 |
| 14 | the same as in Example 1 | | Silicone a | 3 | 0.5 | $C_7H_{15}CO_2NH_4$ | 0.03 | Water | 95.97 |
| | | | Silicone b | | 0.5 | | | | |
| 15 | the same as in Example 2 | | Silicone a | 2 | 2 | $C_7H_{15}CO_2NH_4$ | 0.03 | Water | 95.97 |

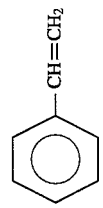

TABLE 2-continued

| Example No. | Copolymer Composition of copolymer | Silicone pbw | Silicone Type | Silicone pbw | Emulsifier | Emulsifier pbw | Solvent Type | Solvent pbw |
|---|---|---|---|---|---|---|---|---|
| Com. 13 | the same as in Comparaive Example 1 | 4 | — | | 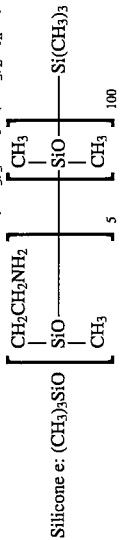 $C_8F_{17}$—〔benzene ring〕—$(OC_2H_4)_{20}OH$ | 0.2 | Water | 95.8 |
| Com. 14 | the same as in Comparaive Example 2 | 4 | — | | $C_7F_{15}CO_2NH_4$ | 0.03 | Water | 95.97 |

Note)
Silicone a: A silicone resin which comprises $(CH_3)_3SiO_{1/2}$ and $SiO_2$ in a mole ratio of 2:1 and has a molecular weight of about 1,000.
Silicone b: A silicone oil of the formula: $(CH_3)_3SiO[Si(CH_3)_2O]_nSi(CH_3)_3$ having a dynamic viscosity of 350 cSt.
Silicone c: A silicone resin which comprises $(CH_3)_3SiO_{1/2}$ and $SiO_2$ in a mole ratio of 3:2 and has a molecular weight of about 2,000.
Silicone d: A silicone oil of the formula: $(CH_3)_3SiO[Si(CH_3)_2O]_nSi(CH_3)_3$ having a dynamic viscosity of 1,000 cSt.

Silicone e: $(CH_3)_3SiO\left[\begin{array}{c}CH_2CH_2NH_2\\|\\SiO\\|\\CH_3\end{array}\right]_5\left[\begin{array}{c}CH_3\\|\\SiO\\|\\CH_3\end{array}\right]_{100}Si(CH_3)_3$

TABLE 3

|  |  | Mold release test | Coating test (Check pattern test) | |
|---|---|---|---|---|
|  |  | Releasability | Primer | Top coat |
| Example | 1 | 1 | 100/100 | 100/100 |
|  | 2 | 1 | 100/100 | 100/100 |
|  | 3 | 1 | 100/100 | 100/100 |
|  | 4 | 1 | 90/100 | 90/100 |
|  | 5 | 1 | 100/100 | 100/100 |
|  | 6 | 1 | 90/100 | 90/100 |
|  | 7 | 1 | 100/100 | 100/100 |
|  | 8 | 1 | 100/100 | 100/100 |
|  | 9 | 1 | 100/100 | 100/100 |
|  | 10 | 2 | 100/100 | 100/100 |
|  | 11 | 2 | 100/100 | 100/100 |
|  | 12 | 1 | 100/100 | 100/100 |
|  | 13 | 1 | 100/100 | 100/100 |
|  | 14 | 1 | 100/100 | 100/100 |
|  | 15 | 1 | 100/100 | 100/100 |
| Com. Ex. | 1 | 1 | 50/100 | 50/100 |
|  | 2 | 1 | 50/100 | 50/100 |
|  | 3 | 1 | 50/100 | 50/100 |
|  | 4 | 2 | 0/100 | 0/100 |
|  | 5 | 3 | 100/100 | 100/100 |
|  | 6 | 2 | 50/100 | 50/100 |
|  | 7 | 1 | 50/100 | 50/100 |
|  | 8 | 3 | 50/100 | 50/100 |
|  | 9 | 3 | 50/100 | 50/100 |
|  | 10 | 3 | 80/100 | 80/100 |
|  | 11 | 3 | 80/100 | 80/100 |
|  | 12 | 2 | 0/100 | 0/100 |
|  | 13 | 1 | 50/100 | 50/100 |
|  | 14 | 1 | 50/100 | 50/100 |

Note) Coating test:
Left values of the data indicate the number of the squares which remained without completely peeling off from the shaped article, per the 100 (10 × 10) squares of 1 mm × 1 mm formed by cut lines reaching the substrate.

What is claimed is:

1. A mold release agent composition comprising:

A) 12.5 to 95% by weight of a copolymer of a polyfluoroalkyl acrylate or methacrylate ester having a polyfluoroalkyl group having 1 to 20 carbon atoms and a vinyl compound having an alkyl group having 8 to 30 carbon atoms, wherein the copolymer comprises 20 to 85% by weight of the perfluoroalkyl acrylate or methacrylate ester and 80 to 15% by weight of the vinyl compound, and B) 87.5 to 5% by weight of a silicone.

2. The mold release agent composition according to claim 1, wherein the amount of the copolymer is from 20 to 70% by weight and the amount of the silicone is from 80 to 30% by weight.

3. A mold release agent composition consisting essentially of:

A) 12.5 to 95% by weight of a copolymer of a polyfluoroalkyl acrylate or methacrylate ester having a polyfluoroalkyl group having 1 to 20 carbon atoms and a vinyl compound having an alkyl group having 8 to 30 carbon atoms, wherein the copolymer comprises 20 to 85% by weight of the perfluoroalkyl acrylate or methacrylate ester and 80 to 15% by weight of the vinyl compound, and B) 87.5 to 5% by weight of a silicone.

4. The mole release agent composition according to claim 3, wherein the amount of copolymer is from 20 to 70% by weight and the amount of the silicone is from 80 to 30% by weight.

5. The mold release agent composition according to claim 1, wherein the perfluoroalkyl acrylate and the methacrylate ester are each encompassed by the formula $CH_2=CR^1COOR^2Rf$, wherein:

$R^1$ is a hydrogen atom or a methyl group, $R^2$ is a linear or branched alkylene group having 1 to 10 carbon atoms, $-SO_2N(R^3)R^4-$ or $-CH_2CH(OR^5)CH_2-$, $R^3$ is an alkyl group having 1 to 10 carbon atoms, $R^4$ is a linear or branched alkylene group having 1 to 10 carbon atoms, $R^5$ is a hydrogen atom or an acyl group having 1 to 10 carbon atoms, and Rf is a linear or branched polyfluoroalkyl group having 1 to 20 carbon atoms.

6. The mold release agent composition according to claim 1, wherein the vinyl compound having the alkyl group having 8 to 30 carbon atoms is encompassed by a formula selected from the group consisting of: $CH_2=CR^1COOR^6$, $CH_2=CHOR^6$, $CH_2=CHOCOR^6$ and $CH_2=CHR^6$, wherein:

$R^1$ is a hydrogen atom or a methyl group, $R^6$ is a $C_{8-30}$ alkyl group, an aralkyl group, an alkenyl group, an alkyl group substituted with a hydroxyl group or a carboxyl group, an aralkyl group substituted with a hydroxyl group or a carboxyl group, or an alkenyl group substituted with a hydroxyl group or a carboxyl group.

7. The mold release agent composition according to claim 1, wherein:

(a) the perfluoroalkyl acrylate and the methacrylate ester are each encompassed by the formula $CH_2=CR^1COOR^2Rf$, wherein:

$R^1$ is a hydrogen atom or a methyl group, $R^2$ is a linear or branched alkylene group having 1 to 10 carbon atoms, $-SO_2N(R^3)R^4-$ or $-CH_2CH(OR^5)CH_2-$, $R^3$ is an alkyl group having 1 to 10 carbon atoms, $R^4$ is a linear or branched alkylene group having 1 to 10 carbon atoms, $R^5$ is a hydrogen atom or an acyl group having 1 to 10 carbon atoms, and Rf is a linear or branched polyfluoroalkyl group having 1 to 20 carbon atoms; and (b) the vinyl compound having the alkyl group having 8 to 30 carbon atoms is encompassed by a formula selected from the group consisting of: $CH_2=CR^1COOR^6$, $CH_2=CHOR^6$, $CH_2=CHOCOR^6$ and $CH_2=CHR^6$, wherein:

$R^1$ is a hydrogen atom or a methyl group, $R^6$ is a $C_{8-30}$ alkyl group, an aralkyl group, an alkenyl group, an alkyl group substituted with a hydroxyl group or a carboxyl group, an aralkyl group substituted with a hydroxyl group or a carboxyl group, or an alkenyl group substituted with a hydroxyl group or a carboxyl group.

8. The mold release agent composition according to claim 3, wherein the perfluoroalkyl acrylate and the methacrylate ester are each encompassed by the formula $CH_2=CR^1COOR^2Rf$, wherein:

$R^1$ is a hydrogen atom or a methyl group, $R^2$ is a linear or branched alkylene group having 1 to 10 carbon atoms, $-SO^2N(R^3)R^4-$ or $-CH_2CH(OR_5)CH_2-$, $R^3$ is an alkyl group having 1 to 10 carbon atoms, $R^4$ is a linear or branched alkylene group having 1 to 10 carbon atoms, $R^5$ is a hydrogen atom or an acyl group having 1 to 10 carbon atoms, and Rf is a linear or branched polyfluoroalkyl group having 1 to 20 carbon atoms.

9. The mold release agent composition according to claim 3, wherein the vinyl compound having the alkyl group having 8 to 30 carbon atoms is encompassed by a formula selected from the group consisting of:

$CH_2=CR^1COOR^6$, $CH_2=CHOR^6$, $CH_2=CHOCOR^6$ and $CH2=CHR6$, wherein:

$R^1$ is a hydrogen atom or a methyl group, $R^6$ is a $C_{8-30}$ alkyl group, an aralkyl group, an alkenyl group, an alkyl group substituted with a hydroxyl group or a carboxyl group, an aralkyl group substituted with a hydroxyl or a carboxyl group, or an alkenyl group substituted with a hydroxyl or a carboxyl group.

10. The mold release agent composition according to claim 3, wherein:

(a) the perfluoroalkyl acrylate and the methacrylate ester are each encompassed by the formula $CH_2=CR^1COOR^2Rf$, wherein:

$R^1$ is a hydrogen atom or a methyl group, $R^2$ is a linear or branched alkylene group having 1 to 10 carbon atoms, $-SO_2N(R^3)R^4-$ or $-CH_2CH(OR^5)CH_2-$, $R^3$ is an alkyl group having 1 to 10 carbon atoms, $R^4$ is a linear or branched alkylene group having 1 to 10 carbon atoms, $R^5$ is a hydrogen atom or an acyl group having 1 to 10 carbon atoms, and Rf is a linear or branched polyfluoroalkyl group having 1 to 20 carbon atoms; and (b) the vinyl compound having the alkyl group having 8 to 30 carbon atoms is encompassed by a formula selected from the group consisting of:

$CH_2=CR^1COOR^6$, $CH_2=CHOR^6$, $CH_2=CHOCOR^6$ and $CH_2=CHR^6$, wherein:

$R^1$ is a hydrogen atom or a methyl group, $R^6$ is a $C_{8-30}$ alkyl group, an aralkyl group, an alkenyl group, an alkyl group substituted with a hydroxyl group or a carboxyl group, an aralkyl group substituted with a hydroxyl group or a carboxyl group, or an alkenyl group substituted with a hydroxyl group or a carboxyl group.

11. The mold release agent according to claim 5, wherein the polyfluoroalkyl acrylate or methacrylate ester is selected from the group consisting of:

$CF_3(CF_2)_7(CH_2)_{10}OCOCH=CH_2$,
$CF_3(CF_2)_7(CH_2)_{10}OCO(CH_3)=CH_2$,
$CF_3(CF_2)_6CH_2OCOCH=CH_2$,
$CF_3(CF_2)_6CH_2OCOC(CH_3)=CH_2$,
$(CF_3)_2CF(CF_2)_6(CH_2)_2OCOCH=CH_2$,
$CF_3(CF_2)_8CH_2OCOCH=CH_2$,
$CF_3(CF_2)_8CH_2OCOC(CH_3)=CH_2$,
$(CF_3)_2CF(CF_2)_8(CH_2)_2OCOCH=CH_2$,
$(CF_3)_2CF(CF_2)_{10}(CH_2)_2OCOCH=CH_2$,
$(CF_3)_2CF(CF_2)_6(CH_2)_2OCOC(CH_3)=CH_2$,
$(CF_3)_2CF(CF_2)_8(CH_2)_2OCOC(CH_3)=CH_2$,
$(CF_3)_2CF(CF_2)_{10}(CH_2)_2OCO(CH_3)=CH_2$,
$CF_3BCF_2(CF_2)_6(CH_2)_2OCOCH=CH_2$,
$CF_3BCF_2(CF_2)_8(CH_2)_2OCOCH=CH_2$,
$CF_3BCF_2(CF_2)_{10}(CH_2)_2OCOCH=CH_2$,
$CF_3BCF_2(CF_2)_6(CH_2)_2OCOC(CH_3)=CH_2$,
$CF_3CF_2(CF_2)_8(CH_2)_2OCOC(CH_3)=CH_2$,
$CF_3CF_2(CF_2)_{10}(CH_2)_2OCOC(CH_3)=CH_2$,
$H(CF_2)_8CH_2OCOC(CH_3)=CH_2$,
$H(CF_2)_8CH_2OCOCH=CH_2$,
$Cl(CF_2CF_2)_3CH_2OCOCH=CH_2$,
$Cl(CF_2CF_2)_3CH_2OCOC(CH_3)=CH_2$,
$Cl(CF_2CF_2)_4CH_2OCOCH=CH_2$,
$Cl(CF_2CF_2)_4CH_2OCOC(CH_3)=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_8CH_2CH(OCOCH_3)CH_2OCOC(CH_3)=CH_2$,
$(CF_3)_2CF(CF_2)_8CH_2CH(OH)CH_2OCOCH=CH_2$ and
$CF_3CF_2(CF_2CF_2)_nCH_2CH_2OCOCH=CH_2$, wherein n is 3 to 5.

12. The mold release agent according to claim 8, wherein the polyfluoroalkyl acrylate or methacrylate ester is selected from the group consisting of:

$CF_3(CF_2)_7(CH_2)_{10}OCOCH=CH_2$,
$CF_3(CF_2)_7(CH_2)_{10}OCO(CH_3)=CH_2$,
$CF_3(CF_2)_6CH_2OCOCH=CH_2$,
$CF_3(CF_2)_6CH_2OCOC(CH_3)=CH_2$,
$(CF_3)_2CF(CF_2)_6(CH_2)_2OCOCH=CH_2$,
$CF_3(CF_2)_8CH_2OCOCH=CH_2$,
$CF_3(CF_2)_8CH_2OCOC(CH_3)=CH_2$,
$(CF_3)_2CF(CF_2)_8(CH_2)_2OCOCH=CH_2$,
$(CF_3)_2CF(CF_2)_{10}(CH_2)_2OCOCH=CH_2$,
$(CF_3)_2CF(CF_2)_6(CH_2)_2OCOC(CH_3)=CH_2$,
$(CF_3)_2CF(CF_2)_8(CH_2)_2OCOC(CH_3)=CH_2$,
$(CF_3)_2CF(CF_2)_6(CH_2)_2OCO(CH_3)=CH_2$,
$CF_3CF_2(CF_2)_6(CH_2)_2OCOCH=CH_2$,
$CF_3CF_2(CF_2)_8(CH_2)_2OCOCH=CH_2$,
$CF_3CF_2(CF_2)_{10}(CH_2)_2OCOCH=CH_2$,
$CF_3CF_2(CF_2)_6(CH_2)_2OCOC(CH_3)=CH_2$,
$CF_3CF_2(CF_2)_8(CH_2)_2OCOC(CH_3)=CH_2$,
$CF_3CF_2(CF_2)_{10}(CH_2)_2OCOC(CH_3)=CH_2$,
$H(CF_2)_8CH_2OCOC(CH_3)=CH_2$,
$H(CF_2)_8CH_2OCOCH=CH_2$,
$Cl(CF_2CF_2)_3CH_2OCOCH=CH_2$,
$Cl(CF_2CF_2)_3CH_2OCOC(CH_3)=CH_2$,
$Cl(CF_2CF_2)_4CH_2OCOCH=CH_2$,
$Cl(CF_2CF_2)_4CH_2OCOC(CH_3)=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_8CH_2CH(OCOCH_3)CH_2OCOC(CH_3)=CH_2$,
$(CF_3)_2CF(CF_2)_8CH_2CH(OH)CH_2OCOCH=CH_2$ and
$CF_3CF_2(CF_2CF_2)_nCH_2CH_2OCOCH=CH_2$, wherein n is 3 to 5.

13. The mold release agent according to claim 6, wherein the vinyl compound having the alkyl group having 8 to 30 carbon atoms is selected from the group consisting of:

$CH_2=CHCOOC_8H_{17}$,
$CH_2=CHCOOC_{10}H_{21}$,
$CH_2=CHCOOC_{12}H_{25}$,
$CH_2=CHCOOC_{18}H_{37}$,
$CH_2=CHCOOC_{22}H_{45}$,
$CH_2=C(CH_3)COOC_8H_{17}$,
$CH_2=C(CH_3)COOC_{10}H_{21}$,
$CH_2=C(CH_3)COOC_{12}H_{25}$,
$CH_2=C(CH_3)COOC_{18}H_{37}$,
$CH_2=C(CH_3)COOC_{22}H_{45}$,
$CH_2=CHCOO-C_6H_4-4-C_8H_{17}$,
$CH_2=CHCOO-C_6H_4-4-C_{12}H_{25}$, $CH_2=CHCOO-C_6H_4-4-C_{18}H_{37}$,
$CH_2=C(CH_3)COO-C_6H_4-4-C_8H_{17}$,
$CH_2=C(CH_3)COO-C_6H_4-4-C_{12}H_{25}$,
$CH_2=C(CH_3)COO-C_6H_4-4-C_{18}H_{37}$,
$CH_2=C(CH_3)COO-C_6H_4-4-C_9H_{19}$,
$CH_2=CHCOO-C_6H_4-4-C_9H_{19}$,
$CH_2=CHOC_8H_{17}$,
$CH_2=CHOC_{10}H_{21}$,
$CH_2=CHOC_{12}H_{25}$,
$CH_2=CHOC_{16}H_{33}$,
$CH_2=CHOC_{18}H_{37}$,
$CH_2=CHOCOC_8H_{17}$,
$CH_2=CHOCOC_9H_{19}$,
$CH_2=CHOCOC_{11}H_{23}$,
$CH_2=CHOCOC_{15}H_{30}$,
$CH_2=CHOCOC_{17}H_{35}$ and
$CH_2=CHC_9H_{19}$.

14. The mold release agent according to claim 9, wherein the vinyl compound having an alkyl group having 8 to 30 carbon atoms is selected from the group consisting of:
$CH_2=CHCOOC_8H_{17}$,
$CH_2=CHCOOC_{10}H_{21}$,
$CH_2=CHCOOC_{12}H_{25}$,
$CH_2=CHCOOC_{18}H_{37}$,
$CH_2=CHCOOC_{22}H_{45}$,
$CH_2=C(CH_3)COOC_8H_{17}$,
$CH_2=C(CH_3)COOC_{10}H_{21}$,
$CH_2=C(CH_3)COOC_{12}H_{25}$,
$CH_2=C(CH_3)COOC_{18}H_{37}$,
$CH_2=C(CH_3)COOC_{22}H_{45}$,
$CH_2=CHCOO-C_6H_4-4-C_8H_{17}$,
$CH_2=CHCOO-C_6H_4-4-C_{12}H_{25}$,
$CH_2=CHCOO-C_6H_4-4-C_{18}H_{37}$,
$CH_2=C(CH_3)COO-C_6H_4-4-C_8H_{17}$,
$CH_2=C(CH_3)COO-C_6H_4-4-C_{12}H_{25}$,
$CH_2=C(CH_3)COO-C_6H_4-4-C_{18}H_{37}$,
$CH_2=C(CH_3)COO-C_6H_4-4C_9H_{19}$,
$CH_2=CHCOO-C_6H_4-4-C_9H_{19}$,
$CH_2=CHOC_8H_{17}$,
$CH_2=CHOC_{10}H_{21}$,
$CH_2=CHOC_{12}H_{25}$,
$CH_2=CHOC_{16}H_{33}$,
$CH_2=CHOC_{18}H_{37}$,
$CH_2=CHOCOC_8H_{17}$,
$CH_2=CHOCOC_9H_{19}$,
$CH_2=CHOCOC_{11}H_{23}$,
$CH_2=CHOCOC_{15}H_{30}$,
$CH_2=CHOCOC_{17}H_{35}$ and
$CH_2=CHC_9H_{19}$.

* * * * *